(12) United States Patent
Kim et al.

(10) Patent No.: US 9,805,225 B2
(45) Date of Patent: Oct. 31, 2017

(54) APPARATUS FOR RECOGNIZING CHARACTER AND BARCODE SIMULTANEOUSLY AND METHOD FOR CONTROLLING THE SAME

(75) Inventors: Sang-Ho Kim, Gyeonggi-do (KR); Seong-Taek Hwang, Gyeonggi-do (KR); Jeong-Wan Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 450 days.

(21) Appl. No.: 13/596,810

(22) Filed: Aug. 28, 2012

(65) Prior Publication Data

US 2013/0063620 A1 Mar. 14, 2013

(30) Foreign Application Priority Data

Sep. 8, 2011 (KR) .................. 10-2011-0091511

(51) Int. Cl.
*G06K 7/10* (2006.01)

(52) U.S. Cl.
CPC .......... *G06K 7/10* (2013.01); *G06K 7/1093* (2013.01); *G06K 7/10881* (2013.01)

(58) Field of Classification Search
USPC .............................. 235/462.07, 454, 462.13
See application file for complete search history.

(56) References Cited

U.S. PATENT DOCUMENTS

| | | | |
|---|---|---|---|
| 4,402,088 A | 8/1983 | McWaters et al. | |
| 4,538,072 A | 8/1985 | Immler et al. | |
| 5,446,271 A * | 8/1995 | Cherry et al. | ............. 235/462.1 |
| 5,550,363 A | 8/1996 | Obata | |
| 5,953,686 A * | 9/1999 | Piernot et al. | ................ 702/150 |
| 5,979,763 A | 11/1999 | Wang et al. | |
| 7,311,256 B2 | 12/2007 | Torchalski | |
| 2002/0074405 A1 | 6/2002 | Hadano et al. | |
| 2012/0081551 A1 | 4/2012 | Mizuno et al. | |

FOREIGN PATENT DOCUMENTS

| | | |
|---|---|---|
| CN | 1802264 | 7/2006 |
| CN | 1848136 | 10/2006 |
| CN | 101207680 | 6/2008 |
| CN | 101271539 | 9/2008 |
| WO | WO 2010/123138 | 10/2010 |

OTHER PUBLICATIONS

Internet article "How Does OCR Work?" at http://www.ehow.com/how-does_4963233_ocr-work.html as captured by the Internet Archive (web.archive.org) on Mar. 18, 2011.*

Chinese Office Action dated May 30, 2016 issued in counterpart application No. 201210328753.6, 15 pages.

* cited by examiner

*Primary Examiner* — Daniel Hess
(74) *Attorney, Agent, or Firm* — The Farrell Law Firm, P.C.

(57) ABSTRACT

A method for controlling a character and barcode recognition apparatus by receiving an image including at least one text image and at least one barcode, dividing the received image into a text area and a barcode area, the text area including the at least one text image and the barcode area including the at least one barcode, recognizing at least one character in the text area by performing character recognition on the text area, and recognizing the at least one barcode in the barcode area by performing barcode recognition on the barcode area.

14 Claims, 10 Drawing Sheets

APPARATUS FOR RECOGNIZING CHARACTER AND BARCODE SIMULTANEOUSLY AND METHOD FOR CONTROLLING THE SAME

PRIORITY

This application claims priority under 35 U.S.C. §119(a) to a Korean Patent Application filed in the Korean Intellectual Property Office on Sep. 8, 2011 and assigned Serial No. 10-2011-0091511, the content of which is incorporated herein by reference.

BACKGROUND OF THE INVENTION

1. Field of the Invention

The present invention relates generally to an apparatus for recognizing characters and a barcode and a method for controlling the same, and more particularly, to a mobile communication terminal having a camera module for capturing characters and a bar code and a method for recognizing characters and a barcode received from the camera module.

2. Description of the Related Art

With the increased use of mobile communication terminals, various services are being provided through the display of the mobile communication terminal, including traffic information services that notify a driver of road conditions during driving, ring tone services that enable a user-specific ring tone sound to be registered and used, and mobile call notification services that alert a user of arrival of a voice message in a voice mail box via text. By providing a number of additional services such as voice mail functionality or special information reception functionality through service providers, mobile communication terminals increase user convenience beyond the traditional call functionality.

Recent mobile communication terminals are typically equipped with a camera module for capturing an object and a memory for storing captured images. Therefore, a user captures an intended scene using a mobile communication terminal. In addition, Optical Character Recognition (OCR) is under active development, as a technology that recognizes characters or a barcode included in a captured image. Specifically, two-dimensional barcodes including more information than conventional one-dimensional barcodes have been developed and increasingly used. Thus, a user captures an image including characters and a barcode using a camera module of a mobile communication terminal and acquire specific information by recognition of the characters and barcode included in the image.

However, conventional methods for recognizing characters and a barcode such as disclosed in U.S. Pat. No. 7,311,256 are limited in simultaneously recognizing characters and a barcode, when both the characters and the barcode appear in an image. That is, according to the conventional character and barcode recognition method, character-only scanning and barcode-only scanning are performed separately for one image. As a result, it takes a long time to acquire information from the entire image.

Further, a high-resolution image is used to recognize characters, whereas a low-resolution image is used to recognize a barcode. If both characters and a barcode are recognized from a single high-resolution image, it may take an excessive amount of time to recognize the barcode or barcode recognition may fail in many cases.

SUMMARY OF THE INVENTION

Accordingly, the present invention has been made to solve the above-stated problems and/or disadvantages and to provide at least the advantages described below. Accordingly, an aspect of the present invention is to provide an apparatus for simultaneously recognizing characters and a bar code and a method for controlling the same.

According to an aspect of the present invention, there is provided a method for controlling a character and barcode recognition apparatus, in which an image including at least one text image and at least one barcode is received, the received image is divided into a text area and a barcode area, the text area including the at least one text image and the barcode area including the at least one barcode, at least one character is recognized in the text area by performing character recognition on the text area, and the at least one barcode is recognized in the barcode area by performing barcode recognition on the barcode area.

According to an aspect of the present invention, there is provided a character and barcode recognition apparatus in which a capturing unit captures and receives an image including at least one text image and at least one barcode, and a controller divides the received image into a text area and a barcode area, the text area including the at least one text image and the barcode area including the at least one barcode, recognizes at least one character in the text area by performing character recognition on the text area, and recognizes the at least one barcode in the barcode area by performing barcode recognition on the barcode area.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
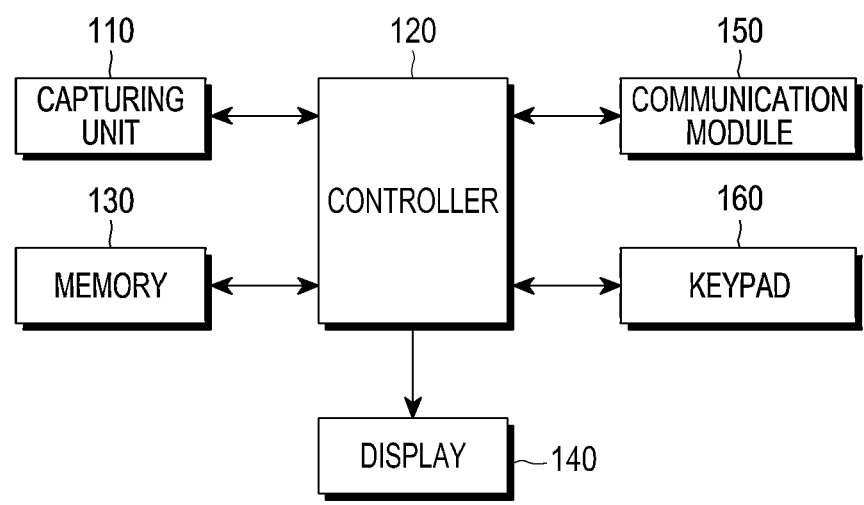
FIG. 1 is a block diagram of a character and barcode recognition apparatus, according to an embodiment of the present invention.

Hereinafter, various embodiments of the present invention are described with reference to the accompanying drawings. In the following description, like reference numerals refer to like elements, features and structures, throughout the drawings. Detailed description of known functions and structures is omitted to avoid obscuring the subject matter of the present invention.

FIG. 1 is a block diagram of a character and barcode recognition apparatus, according to an embodiment of the present invention. The character and barcode recognition apparatus illustrated in FIG. 1 is configured into a mobile communication terminal equipped with capturing means such as a camera module.

Referring to FIG. 1, the character and barcode recognition apparatus includes a capturing unit 110, a controller 120, a memory 130, a display 140, a communication module 150, and a keypad 160.

The capturing unit 110 captures a user-intended scene and converts the captured visible rays into a specific image. The capturing unit 110 includes an image sensor, a lens module, an infrared filter, and a package for accommodating them. The capturing unit 110 adopts a Charge Coupled Device (CCD) sensor or a Complementary Metal Oxide Semiconductor (CMOS) sensor as the image sensor. The lens module is implemented as a spherical or non-spherical surface formed in a transparent material like glass, for forming an optical image by condensing or diverging light reflected from an object. The lens module is implemented as a software lens or a liquid lens as well as a plastic or glass lens. The infrared filter filters light other than visible rays incident through the lens module. The capturing unit 110 captures an image composed of at least one character and at least one barcode.

The controller 120 recognizes the character and barcode in the image received from the capturing unit 110. The controller 120 divides the received image into a text area including the character and a barcode area including the barcode. The division is performed based on the structure of the image and is described in more detail below.

The controller 120 performs character recognition in the text area and barcode recognition in the barcode area. When recognizing the character, the controller 120 uses an OCR program or application pre-stored in the memory 130. The OCR program or application is an optical character recognition program that optically recognizes characters printed in a document. For example, one character is divided into a plurality of grids and read based on the black and white features or line shape features of specific grids. Character recognition is described in more detail below.

The controller 120 performs barcode recognition in the barcode area by known barcode recognition techniques. The character and barcode recognition apparatus captures, for example, a Quick Response (QR) code which is a matrix-type two-dimensional code, and recognizes the captured QR code. In addition, the controller 130 reads information from the QR code using a QR code recognition program or application pre-stored in the memory 130.

If a plurality of barcodes are included in a plurality of barcode areas, the controller 120 recognizes the barcodes simultaneously or sequentially.

The controller 120 stores a character recognition result and a barcode recognition result in the memory 130 or displays them on the display 140. The controller 120 stores or displays the character recognition result and the barcode recognition result separately or in combination.

The controller 120 is configured as, but not limited to, a microprocessor, a minicomputer, or an Integrated Circuit (IC) circuit capable of a series of computations.

The memory 130 stores the OCR program or application and the barcode recognition program or application, as described above. The memory 130 also stores the character or barcode recognition result received from the controller 120. In addition, the memory 130 stores programs, applications, or parameters used to control the character and barcode recognition apparatus. The memory 130 is configured with a storage medium like a Non-Volatile Memory (NVM) and a volatile memory. NVMs include a flash memory card, a Read Only Memory (ROM), and the like, and volatile memories include a Random Access Memory (RAM).

The display 140 may be a Liquid Crystal Display (LCD) or an Organic Light Emitting Diode (OLED) display. The display 140 and the keypad 160 are implemented together into a touch screen. The display 140 displays the recognition results to a user. It will be understood by those skilled in the art that the display 140 can be implemented in various indication means including visual indication means.

The communication module 150 transmits and receives audio data, character data, video data, and control data. The communication module 150 includes a Radio Frequency (RF) transmitter for upconverting the frequency of a transmission signal and amplifying the upconverted transmission signal, an RF receiver for low-noise-amplifying a received signal and downconverting the frequency of the low-noise-amplified signal, and an antenna. A recognition result is stored in an external memory through the communication module 150, or the internal memory 130. The recognition application or program is downloaded and updated through the communication module 150.

The keypad 160 receives commands to control the character and barcode recognition apparatus from the user. For example, the keypad 160 receives a command to operate the character and barcode recognition program or application. The keypad 160 is implemented as a key matrix including alphanumerical keys, function keys, and an external volume key, for outputting a key input signal corresponding to a key input by the user to the controller 120. The keypad 160 and the display 140 are implemented together into a touchscreen.

The controller 120 scans a received full image including a character and a barcode and divides the received image into a text area and a barcode area. Therefore, the time required to recognize both the character and the barcode is reduced.

Figure 2:
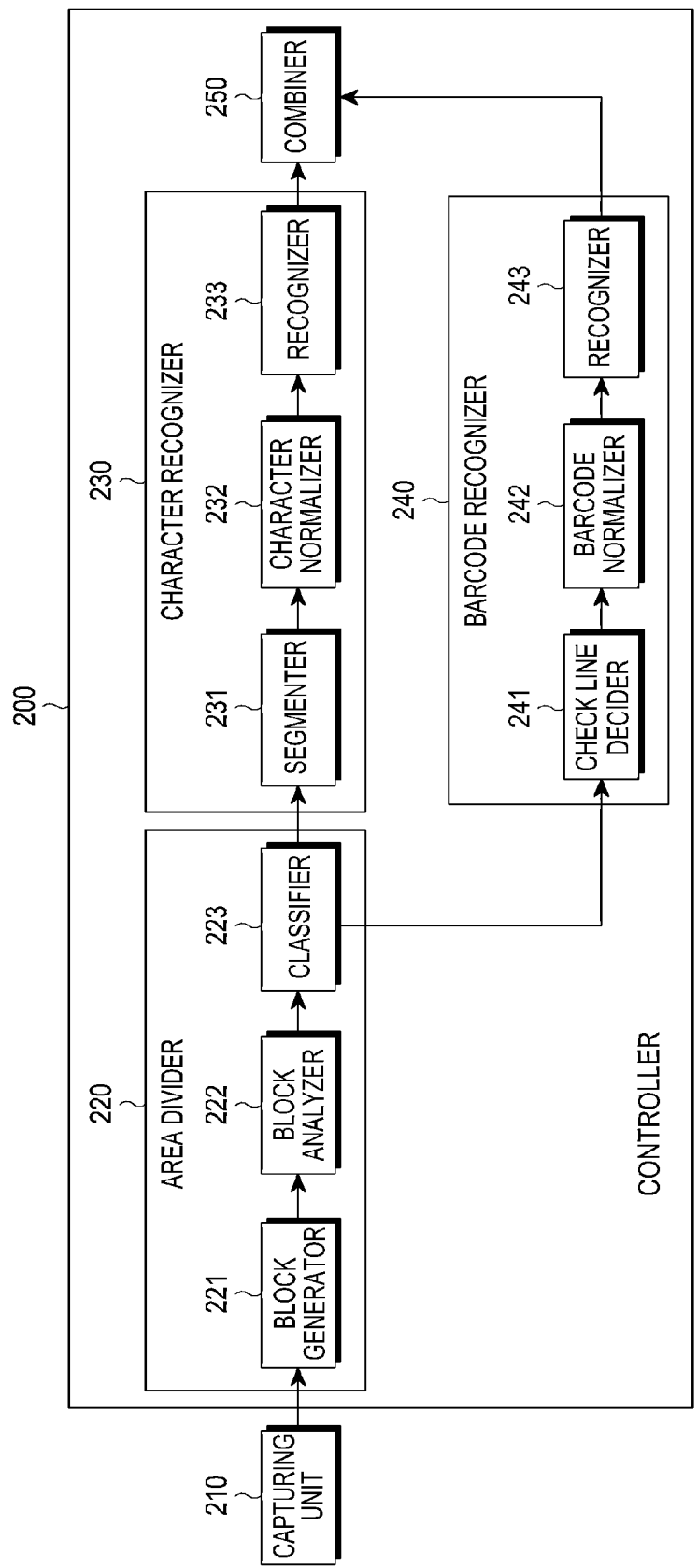
FIG. 2 is a block diagram of the character and barcode recognition apparatus, according to an embodiment of the present invention.

FIG. 2 is a block diagram of the character and barcode recognition apparatus, according to an embodiment of the present invention. While only a capturing unit 210 and a controller 220 are illustrated in FIG. 2, other components illustrated in FIG. 1 may also be included.

Referring to FIG. 2, the character and barcode recognition apparatus includes the capturing unit 210 and the controller 200. The controller 200 includes an area divider 220, a character recognizer 230, a barcode recognizer 240, and a combiner 250.

The area divider 220 divides an image including at least one character and at least one barcode, received from the capturing unit 210 into a text area and a barcode area.

The area divider 220 includes a block generator 221, a block analyzer 222, and a classifier 223. The block generator 221 creates a rectangular block with a set of pixels by extending outermost pixels of a received image. For example, as noted from FIG. 3A, an image captured by the capturing unit 210 includes a plurality of characters and a barcode.

Figure 3A:
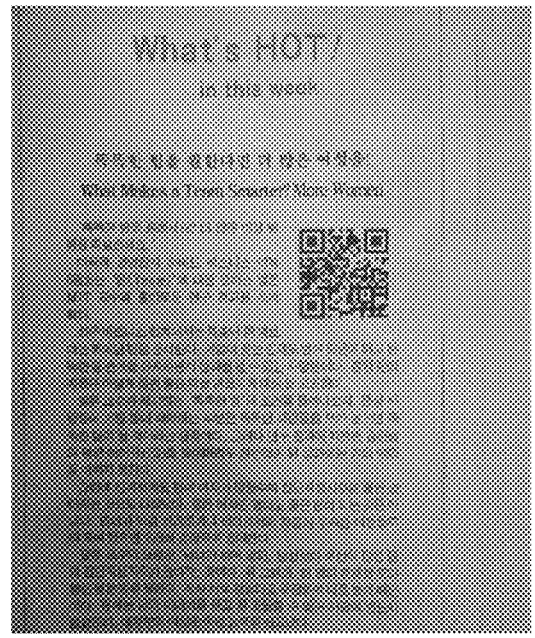
FIGS. 3A to 3G are diagrams illustrating an operation for recognizing characters and a barcode, according to an embodiment of the present invention.
Figure 3B:
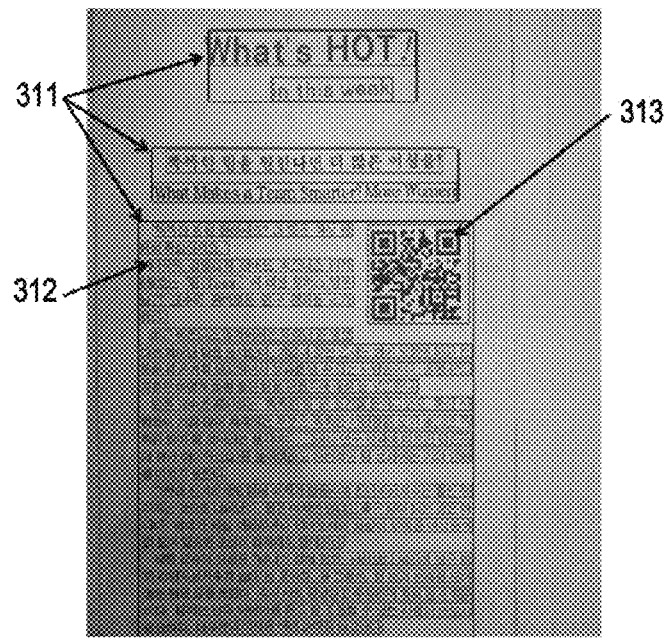

The block generator 221 forms a plurality of rectangular blocks by extending the outermost pixels of the image illustrated in FIG. 3A, as illustrated in FIG. 3B. In FIG. 3B, the block generator 221 creates text blocks 311. Further, the block generator 221 divides a text block 311 into text lines 312 and a barcode block 313.

The block analyzer 222 analyzes the sizes, shapes, and positions of the blocks in the image including the blocks, received from the block generator 221. For example, the block analyzer 222 counts the number of pixels or the pixel range of an uppermost block including the phrase "What's HOT!" with respect to the entire image in FIG. 3B. The block analyzer 222 analyzes the shape of a block using a pixel range occupied by the block, for example, the numbers of pixels along the width and length of the block. The block analyzer 222 outputs information about the analyzed sizes, shapes, and positions of the blocks to the classifier 223.

The classifier 223 classifies the blocks included in the image into text blocks and barcode blocks based on the shapes of the blocks. The classifier 223 determines whether a block is a barcode block by comparing the width-to-length ratio of the block with pre-stored per-block width-to-length ratios read from a memory (not shown). Referring to FIG. 3B, for example, if the barcode block 313 includes a QR code as a barcode, the memory preserves information indicating that the width-to-length ratio of a QR code is 1:1. The classifier 223 reads the width-to-length ratio of the QR code and classifies a block with a width-to-length ratio of 1:1 as a barcode block.

If the width-to-length ratio of a block is not 1:1 accurately, the classifier 223 classifies the block as a barcode block when the width-to-length ratio of the block is equal to or smaller than a predetermined value and classifies the block as a text block when the width-to-length ratio of the block is larger than the predetermined value.

Aside from the QR code type, the classifier 223 classifies various barcode types such as "CODE49," "CODE16K," "PDF417," "DATA CODE," "MAXI CODE," "Veri CODE," "CODEI," "Array Tag," "CP CODE," and "Carla CODE" as barcodes based on per-barcode width-to-length ratios pre-stored in the memory.

The classifier 223 defines all text blocks as a text area and all barcode blocks as a barcode area. The classifier 223 also determines the positions of the text area and the barcode area based on the per-block position information received from the block analyzer 223.

The classifier 223 outputs the received image and information about the positions of the text area and the barcode area to the character recognizer 230 and the barcode recognizer 240.

The area divider 220 compares each pixel with pre-stored character pixel information using a language model and thus divides an image into characters and barcodes. That is, the area divider divides an image into a text area and a barcode area in various manners. It will be apparent to those skilled in the art that a language model-based area division or any other known area division may be used.

The character recognizer 230 recognizes only the text area in the received image based on the information about the position of the text area. The character recognizer 230 includes a segmenter 231, a character normalizer 232, and a recognizer 233.

The segmenter 231 segments a string of characters included in the text area into individual characters.

The segmenter 231 separates lines from the text area by line scanning. Punctuations including commas, periods, colons, semi-colons, and marks are recognized by applying connected component labeling to the lines separated by the segmenter 231. The characters separated by punctuations are further separated by spaces.

The segmenter 231 segments characters included in the text area in the above manner and outputs the segmented characters to the character normalizer 232.

The character normalizer 232 normalizes the segmented characters. Specifically, the character normalizer 232 normalizes the positions, sizes, slopes, and bottom lines of the segmented characters and output the normalized characters to the recognizer 233.

The recognizer 222 recognizes information of the normalized characters by relying on various recognition techniques such as template matching, structure analysis, and statistical character recognition.

The recognizer 233 outputs the character recognition result to the combiner 250. However, alternatively to outputting the character recognition result to the combiner 250 by the recognizer 233, the recognizer 233 stores the character recognition result in a memory (not shown) or displays it on a display (not shown).

The recognizer 230 may perform character recognition in the operation described above or by various known OCR schemes.

The barcode recognizer 240 recognizes a barcode included in the barcode area using the image and the information about the barcode area, received from the classifier 223. The barcode recognizer 240 includes a check line decider 241, a barcode normalizer 242, and a recognizer 243.

The check line decider 241 sets a check line connecting two points of two facing lines among four lines that form the boundary of a barcode in order to determine the center of a binary data cell read from each barcode included in the barcode area.

The check line decider 241 also adds slope information about a two-dimensional code, determines a coefficient of an image position compensated for an image slope, determines coefficients for an image position formula in order to decide the coordinates of the center of each cell compensated for the image slope by adding the slope information about the two-dimensional code, determines the coordinates of the center of each cell by applying the determined coefficients, and generates binary data from image data corresponding to the determined center.

The barcode normalizer 242 performs normalization based on the check line in order to decode code information of the barcode. To decode different spatial information of the barcode, the barcode needs to be normalized.

The recognizer 243 decodes and recognizes information included in the barcode using a normalization result received from the barcode normalizer 242. The recognizer 243 outputs the barcode recognition result to the combiner 250 or stores or displays the barcode recognition result separately from the character recognition result.

The combiner 250 combines the character recognition result received from the recognizer 233 with the barcode recognition result received from the recognizer 243 and stores or displays the combination.

The combiner 250 determines whether the character recognition result or the barcode recognition result includes a Uniform Resource Locator (URL) or an e-mail address. If the character recognition result or the barcode recognition result includes a URL or an e-mail address, the combiner 250 combines the character recognition result with the barcode recognition result by adding a Hyper Text Markup Language (HTML) hyperlink tag. If the character recognition result or the barcode recognition result does not include a URL or an e-mail address, the combiner 250 combines the character recognition result with the barcode recognition result by adding an HTML tag.

Figure 3C:
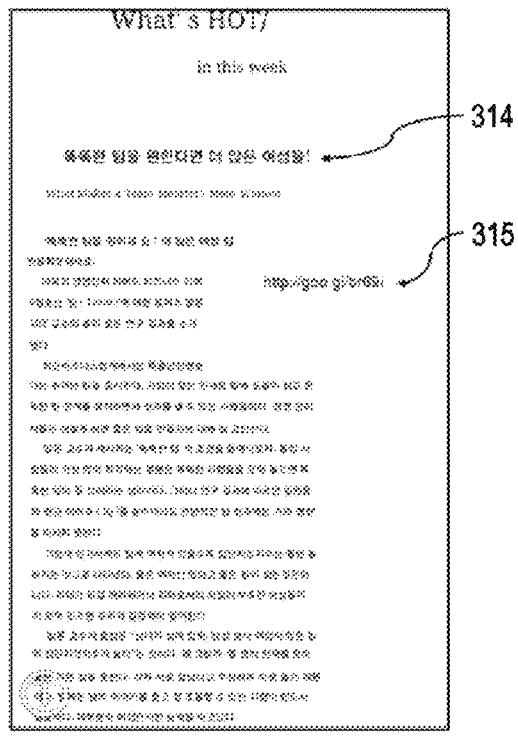
Figure 3D:
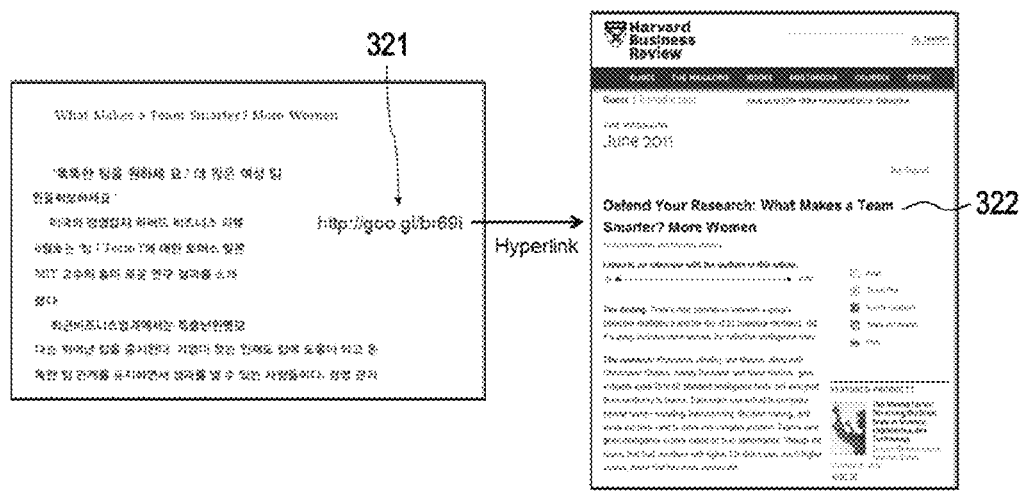

FIG. 3C illustrates an image in which the combiner 250 combines a character recognition result 314 with a barcode recognition result 315, according to an embodiment of the present invention. As illustrated in FIG. 3C, the barcode recognition result 314 is determined to be a URL. Therefore, the barcode recognition result 314 is expressed as an HTML hyperlink tag. Referring to FIG. 3D, a user moves to a homepage 322 of a specific URL by clicking on a barcode recognition result 321.

The character and barcode recognition results are stored or displayed separately, as an alternative to being combined in the combiner 250.

Figure 3E:
Figure 3F:
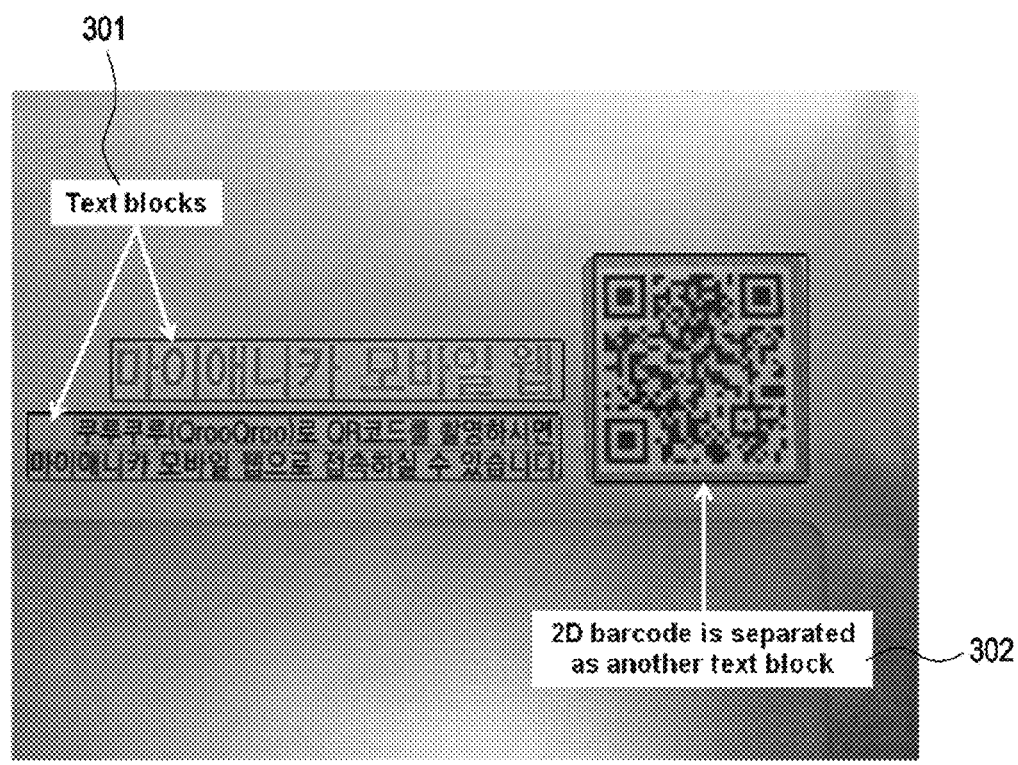
Figure 3G:
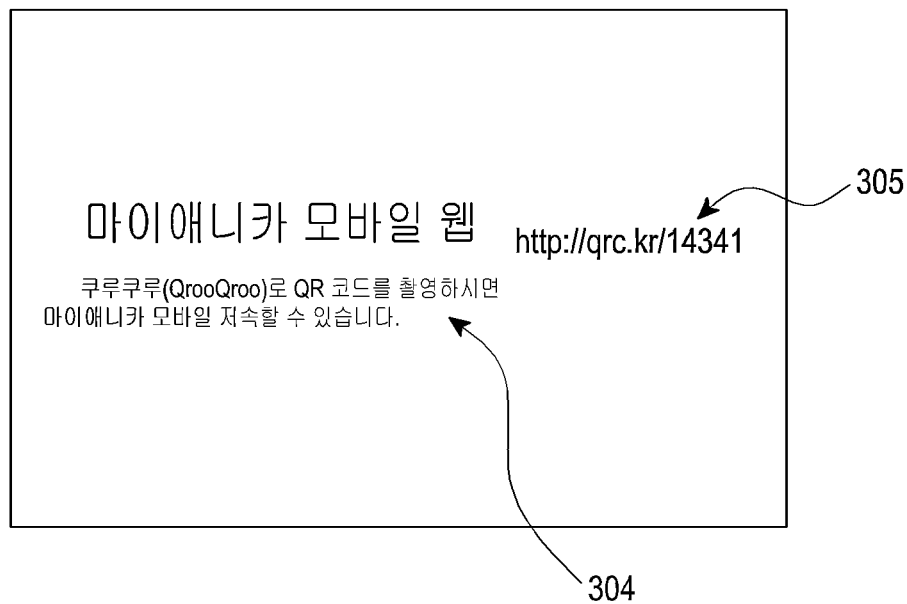

FIGS. 3E, 3F and 3G are diagrams illustrating a character and barcode recognition operation, according to an embodiment of the present invention.

FIG. 3E illustrates an image captured by the character and barcode recognition apparatus, according to an embodiment of the present invention. The image illustrated in FIG. 3E includes characters and a barcode.

The character and barcode recognition apparatus divides the image of FIG. 3E into blocks. FIG. 3F is a diagram illustrating a result of dividing the image illustrated in FIG. 3E into blocks. Referring to FIG. 3F, the blocks include text blocks 301 and a barcode block 302. Compared to FIG. 3B in which a barcode block is included in a text block, the character blocks 301 are separated from the barcode block 302. That is, the barcode block 302 is separated as an independent text block and then as a single text line and it is determined whether the single text line is a text area. If the single text line is classified as a barcode based on the features of the text line, barcode recognition is performed.

FIG. 3G illustrates an image in which character and barcode recognition results are combined, according to an embodiment of the present invention. The image includes a character recognition result 304 and a barcode recognition result 305. As described above, if the barcode recognition result is a URL, it is expressed as an HTML hyperlink tag.

Figure 4:
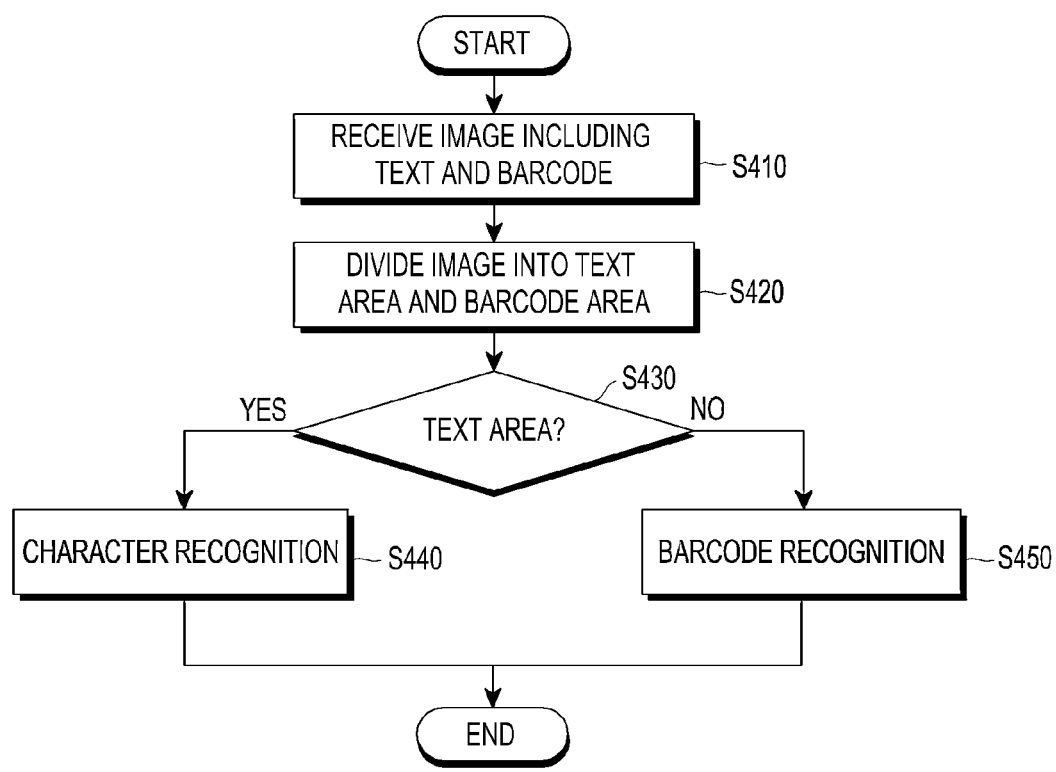
FIG. 4 is a flowchart illustrating a method for controlling the character and barcode recognition apparatus, according to an embodiment of the present invention.

FIG. 4 is a flowchart illustrating a method for controlling the character and barcode recognition apparatus, according to an embodiment of the present invention.

Referring to FIG. 4, the character and barcode recognition apparatus receives an image including a character and a barcode, in Step 410.

The character and barcode recognition apparatus divides the received image into a text area and a barcode area, in Step 420. The character and barcode recognition apparatus determines whether an area is the text area, in Step 430. If determining that the area is the text area, the character and barcode recognition apparatus performs character recognition, in Step 440. If determining that the area is the barcode area, the character and barcode recognition apparatus performs barcode recognition, in Step 450.

Figure 5:
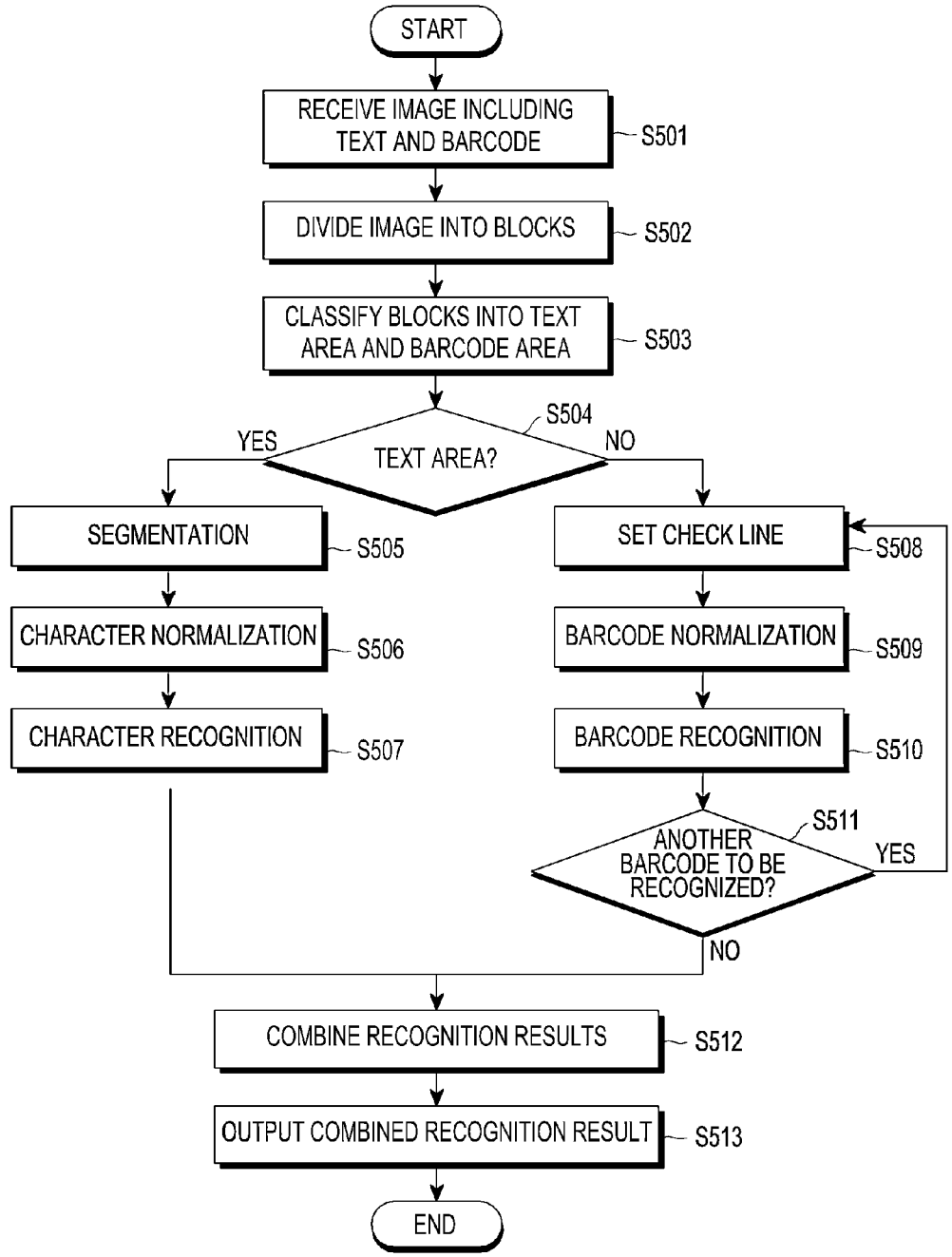
FIG. 5 is a flowchart illustrating the method for controlling the character and barcode recognition apparatus, according to an embodiment of the present invention.

FIG. 5 is a flowchart illustrating the method for controlling the character and barcode recognition apparatus, according to an embodiment of the present invention.

Referring to FIG. 5, the character and barcode recognition apparatus receives an image including a character and a barcode, in Step 501.

The character and barcode recognition apparatus divides the received image into blocks, in Step 502. As described above, the character and barcode recognition apparatus divides the image into blocks by extending the outermost pixels of the image, as described above.

The character and barcode recognition apparatus analyzes information about the sizes, shapes, and positions of the blocks. Specifically, the character and barcode recognition apparatus determines whether a block is a text block or a barcode block, based on the size of the block. The character and barcode recognition apparatus collects the text blocks and barcode blocks and classify the collected text blocks and the collected barcode blocks into a text area and a barcode area, respectively, in Step 503.

The character and barcode recognition apparatus determines whether an area is the text area, in Step 504. If the area is the text area, the character and barcode recognition apparatus segments the text area into individual characters, in Step 505.

The character and barcode recognition apparatus normalizes the individual characters, in Step 506 and recognize the normalized characters, in Step 507.

If the area is the barcode area, the character and barcode recognition apparatus sets a check line in the barcode area, in Step 508. The character and barcode recognition apparatus normalizes the barcode based on the check line, in Step 509. Then the character and barcode recognition apparatus reads information from the barcode by decoding the barcode, in Step 510.

The character and barcode recognition apparatus determines whether there is another barcode in the barcode area, in Step 511. In the presence of another barcode, the character and barcode recognition apparatus performs check line decision, barcode normalization, and barcode recognition on the additional barcode. In the absence of any more barcode, the barcode recognition procedure ends.

The character and barcode recognition apparatus combines the text recognition result with the barcode recognition result, in Step 512 and outputs the combined recognition result, in Step 513. The text recognition result and the barcode recognition result is stored or displayed separately.

Figure 6:
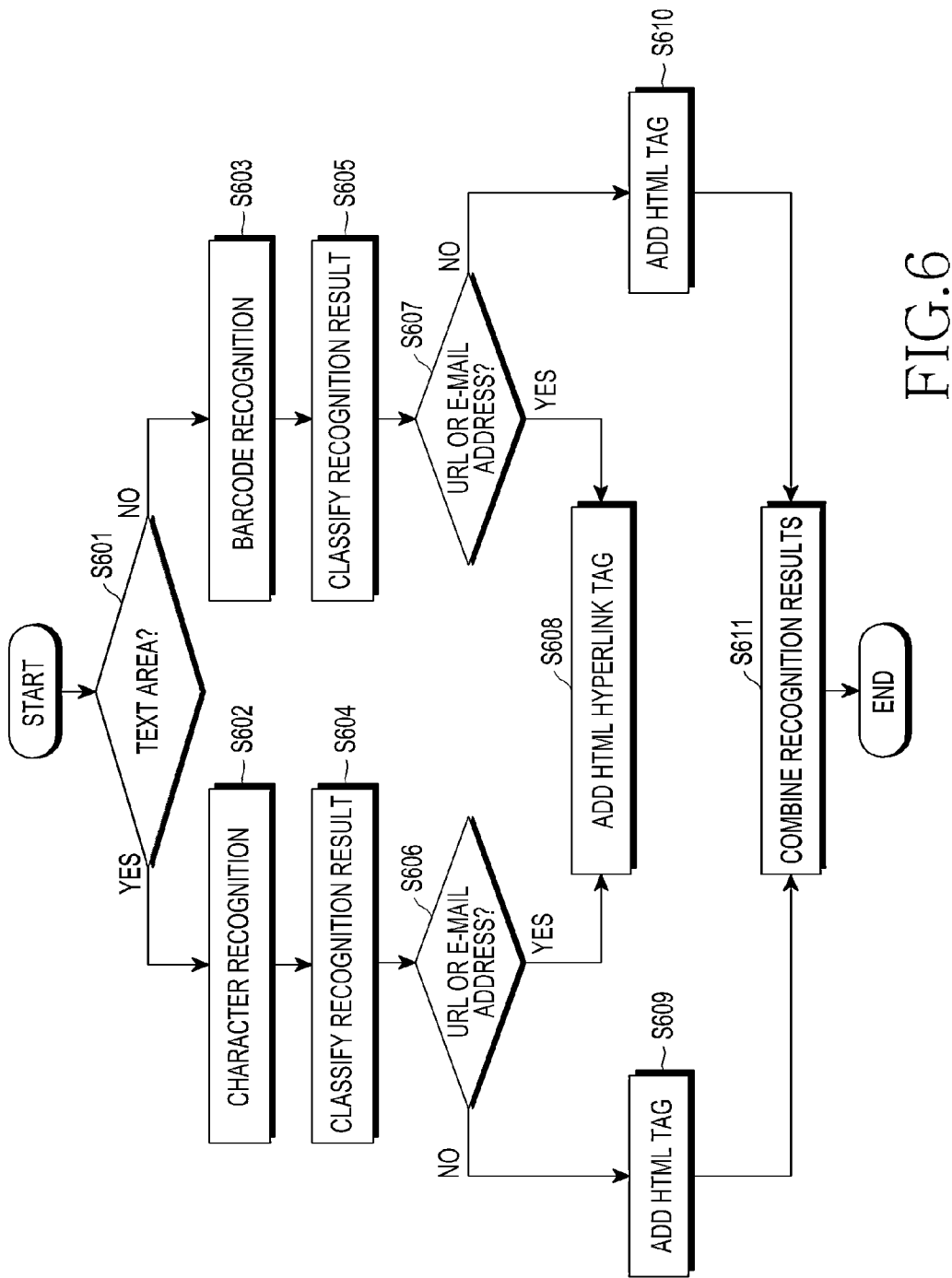
FIG. 6 is a flowchart illustrating an operation for combining a character recognition result with a barcode recognition result, according to an embodiment of the present invention.

FIG. 6 is a flowchart illustrating an operation for combining a character recognition result with a barcode recognition result, according to an embodiment of the present invention.

Referring to FIG. 6, the character and barcode recognition apparatus determines whether an area is a text area or a barcode area, in Step 601. In the case of the text area, the character and barcode recognition apparatus performs character recognition, in Step 602. In the case of the barcode area, the character and barcode recognition apparatus performs barcode recognition, in Step 603.

The character and barcode recognition apparatus classifies the character recognition result, in Step 604 and thus determines whether the character recognition result is a URL or an e-mail address, in Step 606. If the character recognition result is a URL or an e-mail address, the character and barcode recognition apparatus adds an HTML hyperlink tag, in Step 608. If the character recognition result is not a URL or an e-mail address, the character and barcode recognition apparatus adds an HTML tag, in Step 609.

The character and barcode recognition apparatus classifies the barcode recognition result, in Step 605 and thus determines whether the barcode recognition result is a URL or an e-mail address, in Step 607. If the barcode recognition result is a URL or an e-mail address, the character and barcode recognition apparatus adds an HTML hyperlink tag, in Step 608. If the barcode recognition result is not a URL or an e-mail address, the character and barcode recognition apparatus adds an HTML tag, in Step 610.

The character and barcode recognition apparatus combines the character recognition result with the barcode recognition result, in Step 611.

As described above, the character and barcode recognition apparatus and the method for controlling the same enable simultaneous recognition of a character and a barcode. Therefore, the time taken to read information from an entire image is reduced. Since a low-resolution image is used for barcode recognition, the success rate of barcode recognition is increased.

While the present invention has been shown and described with reference to various embodiments thereof, it will be understood by those of ordinary skill in the art that changes in form and detail may be made without departing from the spirit and scope of the present invention as defined by the appended claims.

What is claimed is:

1. A method for controlling a character and barcode recognition apparatus, comprising:
   receiving an image including at least one text and at least one barcode;
   dividing the received image into a text area and a barcode area based on a width-to-length ratio of blocks in the image, the text area including the at least one text and the barcode area including the at least one barcode;
   recognizing at least one character in the text area by performing character recognition on the text area;
   recognizing the at least one barcode in the barcode area by performing barcode recognition on the barcode area; and
   outputting a text including a character recognition result and a barcode recognition result by combining the character recognition result with the barcode recognition result,
   wherein recognizing the at least one barcode comprises:
   setting a check line in the barcode area;
   normalizing the at least one barcode included in the barcode area based on the check line; and
   reading information included in the barcode based on a result of the barcode normalization.

2. The method of claim 1, wherein dividing the received image comprises:
   dividing the received image into the blocks including the at least one text and blocks including the at least one barcode;
   classifying the blocks into text blocks and barcode blocks; and
   determining the text blocks to be the text area and determining the barcode blocks to be the barcode area.

3. The method of claim 2, wherein classifying the blocks into text blocks and barcode blocks comprises classifying the blocks into text blocks and barcode blocks according to shapes of the blocks.

4. The method of claim 3, wherein classifying the blocks into the text blocks and the barcode blocks further comprises:
   classifying a block as a barcode block, if the width-to-length ratio of the block is equal to or smaller than a predetermined value; and
   classifying a block as a text block, if the width-to-length ratio of the block is larger than the predetermined value.

5. The method of claim 1, wherein combining the character recognition result with the barcode recognition result comprises combining the character recognition result with the barcode recognition result by adding a hyperlink tag, if the character recognition result or the barcode recognition result includes a Uniform Resource Locator (URL) or an e-mail address.

6. The method of claim 1, wherein recognizing the at least one character comprises:
   segmenting the text area into individual characters;
   normalizing the individual characters; and
   recognizing the normalized characters.

7. The method of claim 6, wherein recognizing the normalized characters comprises recognizing the normalized characters by at least one of a template matching scheme, a structure analysis scheme, and a statistical character recognition scheme.

8. A character and barcode recognition apparatus comprising:
   a capturing unit for capturing and receiving an image including at least one text and at least one barcode; and
   a controller for dividing the image into a text area and a barcode area based on a width-to-length ratio of blocks in the image, the text area including the at least one text and the barcode area including the at least one barcode, recognizing at least one character in the text area by performing character recognition on the text area, recognizing the at least one barcode in the barcode area by performing barcode recognition on the barcode area, and outputting a text including a character recognition result and a barcode recognition result by combining the character recognition result with the barcode recognition result,
   wherein the controller comprises:
   a check line decider for setting a check line in the barcode area;
   a barcode normalizer for normalizing the at least one barcode included in the barcode area based on the check line; and
   a recognizer for reading information included in the barcode based on a result of the barcode normalization.

9. The character and barcode recognition apparatus of claim 8, wherein the controller comprises:
   a block generator for dividing the image into the blocks including the at least one text and blocks including the at least one barcode;
   a block analyzer for analyzing at least one of size information, shape information, and position information about the blocks; and
   a classifier for classifying the blocks into text blocks and barcode blocks, determining the text blocks to be the text area, and determining the barcode blocks to be the barcode area.

10. The character and barcode recognition apparatus of claim 9, wherein the classifier classifies the blocks into text blocks and barcode blocks according to shapes of the blocks.

11. The character and barcode recognition apparatus of claim 10, wherein if the width-to-length ratio of a block is equal to or smaller than a predetermined value, the classifier classifies the block as a barcode block, and if the width-to-length ratio of a block is larger than the predetermined value, the classifier classifies a block as a text block.

12. The character and barcode recognition apparatus of claim 8, further comprising a combiner that combines the character recognition result with the barcode recognition result by adding a hyperlink tag, if the character recognition result or the barcode recognition result includes a Uniform Resource Locator (URL) or an e-mail address.

13. The character and barcode recognition apparatus of claim 8, wherein the controller comprises:
   a segmenter for segmenting the text area into individual characters; and
   a character normalizer for normalizing the individual characters, wherein the recognizer recognizes the normalized characters.

14. The character and barcode recognition apparatus of claim 13, wherein the recognizer recognizes the normalized characters by at least one of a template matching scheme, a structure analysis scheme, and a statistical character recognition scheme.

* * * * *